United States Patent [19]
Bohme

[11] 3,945,440
[45] Mar. 23, 1976

[54] FIRE EXTINGUISHING APPARATUS FOR OXY-ACETYLENE WELDING ASSEMBLIES
[76] Inventor: August Edward Bohme, 5759 Larson Place, West Vancouver, British Columbia, Canada
[22] Filed: June 23, 1975
[21] Appl. No.: 589,710

[52] U.S. Cl. .................. 169/54; 169/5; 239/304; 431/127
[51] Int. Cl.² .................. F23D 13/46; A62C 13/00
[58] Field of Search .......... 169/5, 9, 16, 18, 30, 71, 169/75, 91; 239/304, 305; 431/127, DIG. 30, DIG. 35

[56] References Cited
FOREIGN PATENTS OR APPLICATIONS
1,220,828  1/1971  United Kingdom .................. 169/54

Primary Examiner—Evon C. Blunk
Assistant Examiner—Andres Kashnikow
Attorney, Agent, or Firm—Carver and Company

[57] ABSTRACT

The fire extinguishing apparatus for oxy-acetylene welding assemblies having a cylinder having a free floating piston, over the actuator of a release valve, mountable at one end of a pressurized bottle containing a fire extinguishing fluid and connectable at its opposite end to an oxygen return line and a valve assembly connectable between the oxygen line and the torch, the valve assembly has a through passage for enabling passage of oxygen from the oxygen line to the torch and an intersecting passage having a manually operated shut-off valve intersecting the through passage at one end and having means at its opposite end for connection to the oxygen return line to the bottle of extinguishing fluid for enabling pressurized oxygen to flow to the cylinder and move the piston into operating engagement with the actuator of the release valve so as to release the fire extinguishing fluid therefrom. A discharge hose is extended from the fire extinguishing fluid bottle to the operator of the welding torch.

4 Claims, 3 Drawing Figures

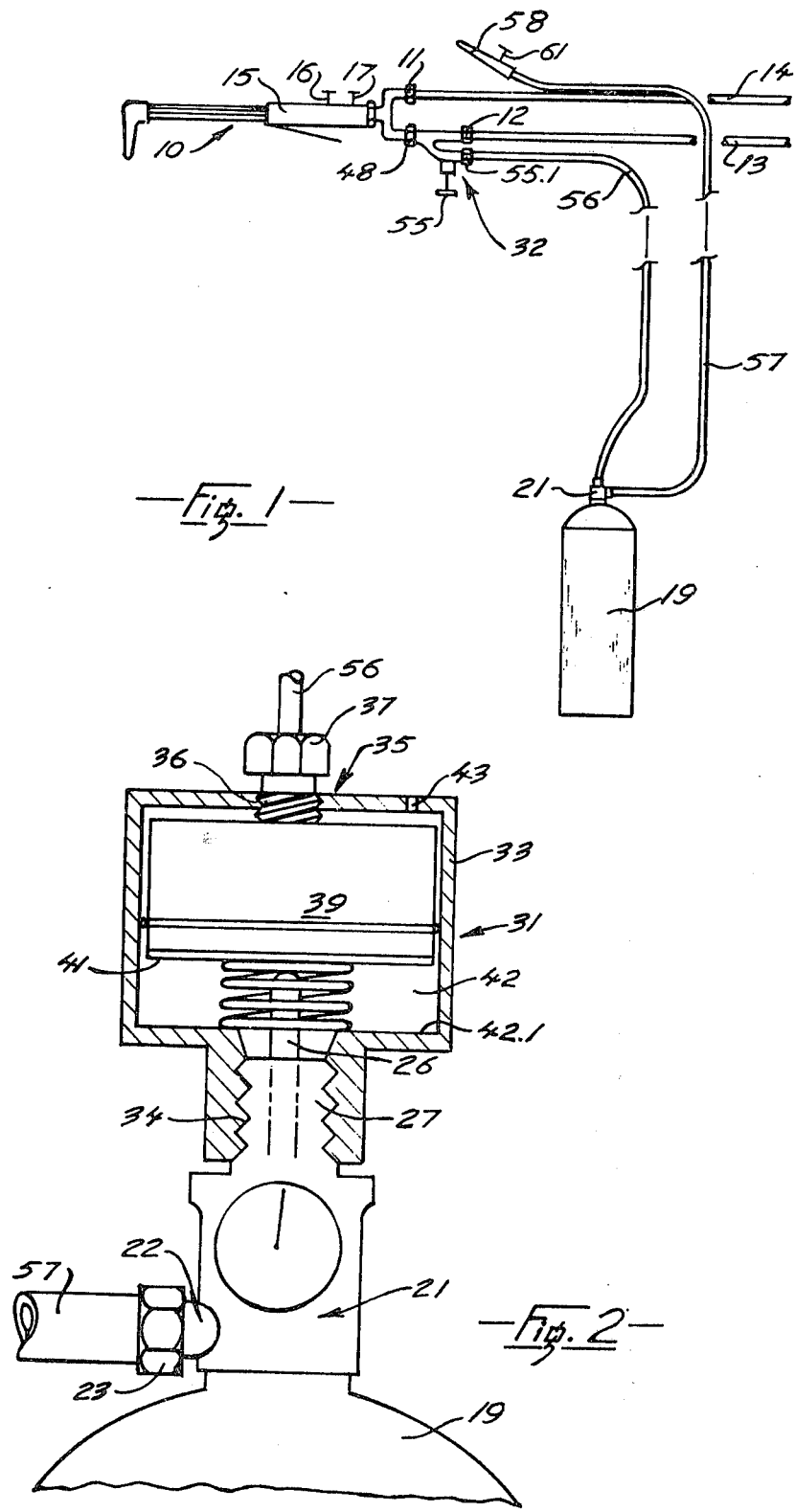

FIRE EXTINGUISHING APPARATUS FOR OXY-ACETYLENE WELDING ASSEMBLIES

BACKGROUND OF THE INVENTION

1. Field of the Invention

This invention relates to fire extinguishing devices.

2. Prior Art

Due to the dangers inherent in the use of welding torches in the construction and repair of structures where inflammable material is near or at the area in which the welding torch is to be used it is generally incumbent upon the welder to carry a fire extinguisher with him.

In areas in which access is difficult, for instance in large ships and the like, the oxygen and acetylene bottles can be located remote from the area in which the welding is to be done as the oxygen and acetylene hoses can be extended for any reasonable length.

The carrying of a fire extinguisher quite often proves very troublesome and in very close quarters might have to be located some distance away from the point of welding which thus, invariably, causes some delay as it necessitates the welder to shut off his torch, return to the fire extinguisher and carry it to a point where he can apply the extinguishing fluid to the fire. In some instances where movement may be difficult and slow, a delay can result in the fire getting out of hand to such an extent that it cannot be extinguished by the conventional extinguisher.

SUMMARY OF THE INVENTION

The present invention provides fire extinguishing apparatus which enables a welder to open, through the mediacy of controls at his torch, a pressurized bottle of fire extinguishing fluid located at a distance remote from his torch and convey the extinguishing fluid thus released through a discharge hose which can be located near him so that if a fire should start he can extinguish it while it is still in its incipient stage.

The apparatus of the present invention is adapted to be used with an oxy-acetylene welding assembly having a welding torch provided with couplings for connection to pressurized lines extending from a source of oxygen and acetylene and operative shut-off valves on the torch for controlling the issuance of oxygen and acetylene therefrom and a pressurized bottle of fire extinguishing fluid having a valve assembly provided with a discharge port and a possible actuator for releasing the fluid through the port, the apparatus includes a cylinder connectable at one end to the extinguishing bottle over the actuator therein and connectable at its opposite end to a return oxygen line, a piston freely slides within the cylinder and is adapted to engage the actuator of the extinguishing bottle, a valve assembly connectable between the oxygen line from the oxygen bottle and the torch the valve assembly having a through passage for enabling the passage of the oxygen to the torch, an intersecting passage intersecting, at one end, the through passage and having at its opposite end means for coupling the intersecting passage to a return oxygen line to the extinguishing bottle and a normally-closed, manually operated valve in intersecting passage adapted when opened to release pressurized oxygen to the oxygen return line to the cylinder so as to move the piston into operating engagement with the actuator of the extinguishing bottle, and a discharge line connectable at one end to the discharge port of the extinguishing bottle, and a discharge line connectable at one end to the discharge port of the extinguishing fluid bottle so as to enable discharge of extinguishing fluid at a point remote from the fire extinguishing bottle.

A detailed description following, related to the drawings, gives exemplification of apparatus and method according to the invention which, however, is capable of expression in method and means other than those particularly described and illustrated.

DESCRIPTION OF THE DRAWINGS

FIG. 1 is a diagrammatic view showing fire extinguishing apparatus of the invention connected to welding apparatus, FIG. 2 is a central sectional view of a piston-cylinder assembly secured to a discharge valve of a pressurized bottle of fire extinguishing fluid.

DETAILED DESCRIPTION

Figure 3:
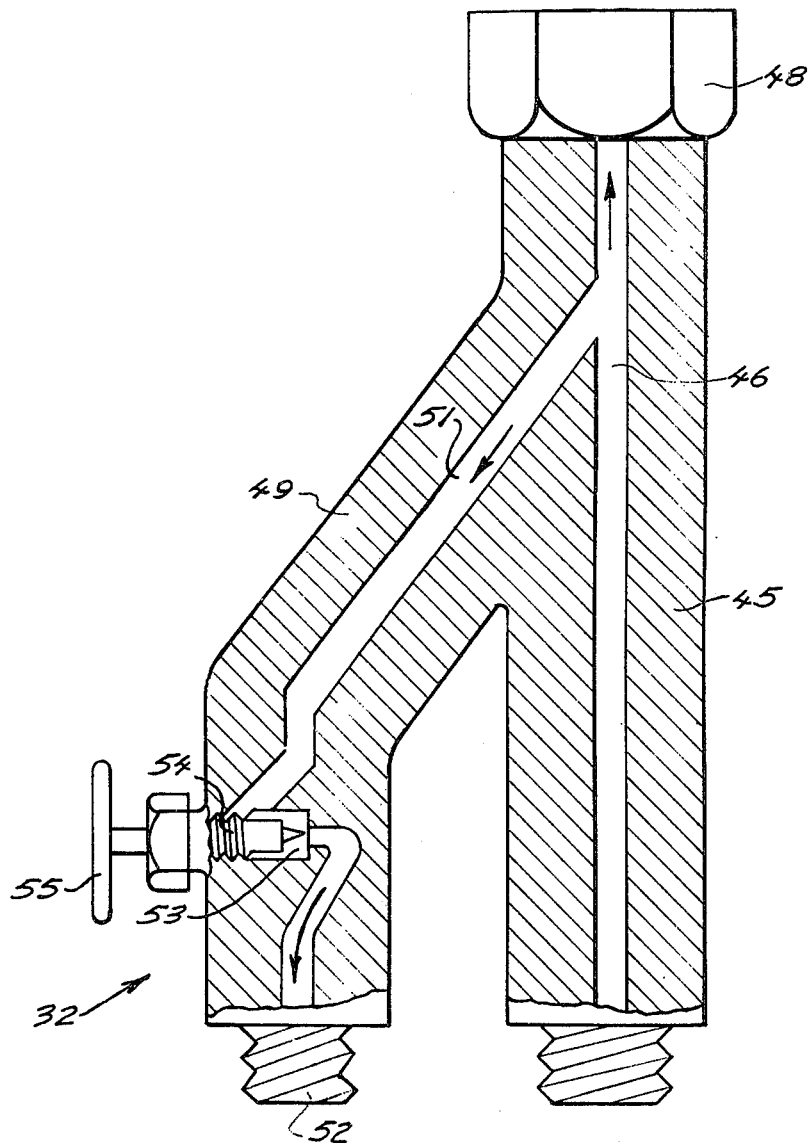
FIG. 3 is a central sectional view of a manually operated valve assembly connectable to a welding torch.

Referring to the drawings and in particular to FIG. 1, which shows diagrammatically, the fire extinguishing apparatus of the invention in association with oxy-acetylene welding equipment, the numeral 10 designates a welding torch normally connected by couplings 11 and 12 to oxygen and acetylene lines 13 and 14, respectively, which are extended to pressurized sources of both gases, conventionally pressurized bottles, not shown, which are, conventionally, carried on a cart, not shown, for easy transportation. The torch, conventionally, has a mixing chamber 15 into which flow of oxygen and acetylene is controlled by a manually operated valves 16 and 17.

Referring to FIGS. 1 and 2, a conventional pressure bottle 19 containing a pressurized fire extinguishing fluid which can be gaseous or a liquid is used in conjunction with the invention. Release of the extinguishing agent from the pressure bottle is effected by operation of a known, conventional, valve assembly 21 secured thereto. The valve assembly 21 has a discharge tube 22 provided with a coupling 23 for the connection of a hose thereto and a spring closed valve, not shown, which has a valve stem 26 which, when depressed, permits release of the agent from the bottle. Normally the upper end 27 of the valve assembly 21 is threaded.

The apparatus of the invention, proper, includes a piston and cylinder assembly 31 which is securable to the valve assembly 21 which when subject to a pressurized gas can open the fire extinguisher bottle; and a manually operated valve assembly 32, see FIG. 3, which is connected between the torch and oxygen line and piston and cylinder assembly 31 for pressurizing the piston and cylinder assembly.

Referring to FIG. 2, the piston and cylinder assembly has a cylinder 33 which is threaded at its lower end 34 for making threaded connection with the upper end 27 of the valve assembly 21. The cylinder has an upper end wall 35 having an aperture 36 into which a hose coupling 37 is threaded. A piston 39 slidably and sealably fits in the cylinder for reciprocal movement and has a lower face 41 adapted to make contact with the valve stem 26. A spring 42 extending under compression between the piston and end wall 42.1 of the cylinder normally urges the piston upwards off the valve stem so as to prevent accidental opening of the fire extinguisher bottle. The cylinder has a relief port 43, which is of a pin-hole size, in the upper end wall 35.

Referring to FIG. 3, the valve assembly 32 has a main tubular portion 45 through which extends a main passage 46. The main portion 45 is provided with a coupling 48, at one end, for connection to the oxygen inlet of the torch and is threaded at its other end for coupling to the oxygen hose from the source of supply of oxygen. The valve assembly 32 also has a branch tube 49 having a passage 51 which, at one end, intersects the main passage 46 and opens at its other end through a threaded end 52 of the branch for receiving a coupling connection. The branch tube 49 has a valve chamber 53 intersecting the passage 51 into which a threaded valve element 54 having an operating handle 55 is extended for selectively opening or closing the passage 51 to the passage of oxygen therethrough.

Referring again to FIGS. 1 and 3, the branch passage 51 is connected in the coupling 55.1 to the return oxygen hose 56 and a fire discharge extinguishing hose 57 is connected at one end to the discharge tube of the valve assembly 21. The hose 57 has a nozzle 58 at its other end.

OPERATION

In setting up the apparatus the pressure bottle containing the extinguishing agent can be fixed to the same rack or carrier containing the oxygen and acetylene bottles and the oxygen and acetylene lines and the return oxygen and fire extinguishing hoses can be taped together as one compact bundle with the nozzle of the extinguisher hose positioned just behind the welding torch so as to be immediately available by use of the welder-operator.

To open the extinguisher bottle in the event of fire, the welder first shuts off the flow of oxygen and acetylene to the torch by suitable operation of the valves 16 and 17 and then opens the passage 51 which directs pressurized oxygen to the oxygen return hose to the piston cylinder assembly 31 so that the piston moves into actuating engagement with the valve stem and thus opens the valve assembly 21 to enable the extinguishing agent to pass through the fire extinguisher hose 57 and thence through the nozzle. As long as the passage 51 remains open the piston, due to pressurizing of the cylinder, will remain in its actuating position against the valve stem. When the valve 54 is closed to shut off the flow of oxygen to the cylinder, pressure drop, due to bleeding of oxygent through the bleed port 43, enables the valve stem and the spring 42 to lift the piston and thus close the extinguishing bottle.

Closure and control of the extinguishing hose to the passage of the extinguishing agent therethrough can also be effected by manual operation of a closure valve 61 at the nozzle.

I claim:

1. Fire extinguishing apparatus for oxy-acetylene assemblies having a welding torch provided with couplings for connection to pressurized lines extendable from a source of oxygen and acetylene and provided with manually operative shut-off valves for controlling the issuance of oxygen and acetylene therefrom and a pressurized bottle of fire extinguishing fluid having a valve assembly provided with a discharge port and a release actuator for releasing the extinguishing fluid through the port, said apparatus including:
   a. a cylinder connectable at one end to a bottle of fire extinguishing fluid over the actuator therein and connectable at its opposite end to a return oxygen line,
   b. a piston freely slidable within the cylinder adapted to be moved into operative engagement with the actuator of the bottle,
   c. a valve assembly connectable between the oxygen line from the oxygen bottle and the welding torch the valve assembly having a main passage for enabling the passage of oxygen to the torch and an intersecting passage intersecting at one end, the through passage and having at its opposite end means for coupling to the return oxygen line and a normally closed manually operated valve in the intersecting passage adapted when open to release pressurized oxygen through the oxygen return line so as to move the piston into operating engagement with the actuator to enable discharge of the extinguishing fluid from the pressurized bottle of fire extinguishing fluid,
   d. a discharge line connectable at one end of the discharge port of the extinguishing fluid bottle so as to enable discharge of the extinguishing fluid at a point remote from the fire extinguishing bottle.

2. Apparatus as claimed in claim 1 in which a cylinder has a bleed port for reducing pressure in the cylinder when the manually operated valve of the intersecting passage is closed so as to enable the valve of the fire extinguishing bottle to close.

3. Apparatus as claimed in claim 1 including a valve controlled nozzle at the end of the fire extinguishing discharge line for controlling the flow of fire extinguishing fluid from said line.

4. Apparatus as claimed in claim 1 including spring means for yieldably lifting the piston off the actuator when the cylinder is unpressurized.

* * * * *